US006326548B1

(12) United States Patent
Okumura et al.

(10) Patent No.: US 6,326,548 B1
(45) Date of Patent: Dec. 4, 2001

(54) END-PROCESSED COAXIAL CABLE STRUCTURES AND METHODS FOR PRODUCING THE SAME

(75) Inventors: Hideo Okumura; Yasushi Tsutsui, both of Shizouka Pref.; Yukinori Tominaga, Shizuoka-Pref, all of (JP)

(73) Assignee: Nissei Electric Co., Ltd., Shizuoka (JP)

( * ) Notice: Subject to any disclaimer, the term of this patent is extended or adjusted under 35 U.S.C. 154(b) by 0 days.

(21) Appl. No.: 09/385,450

(22) Filed: Aug. 30, 1999

(30) Foreign Application Priority Data

Jul. 9, 1999 (JP) ........................................ 11-196354

(51) Int. Cl.[7] ........................................ H02G 15/08

(52) U.S. Cl. ........................................ 174/88 C

(58) Field of Search ........................ 174/75 C, 88 C, 174/88 R, 117 F, 78; 439/497, 579, 610, 98; 29/828, 868, 878

(56) References Cited

U.S. PATENT DOCUMENTS

| | | | | |
|---|---|---|---|---|
| 4,365,856 | * | 12/1982 | Yaegashi et al. | 439/497 |
| 4,773,879 | | 9/1988 | Pauza . | |
| 4,965,412 | | 10/1990 | Lai et al. . | |
| 5,132,490 | | 7/1992 | Aldissi . | |
| 5,212,348 | * | 5/1993 | Gibson | 174/117 F X |
| 5,281,762 | * | 1/1994 | Long et al. | 174/78 |
| 5,293,001 | | 3/1994 | Gebs . | |
| 5,940,963 | * | 8/1999 | Tolmie et al. | 174/177 F X |

FOREIGN PATENT DOCUMENTS 10-144145 * 5/1998 (JP) .

* cited by examiner

*Primary Examiner*—Chau N. Nguyen
(74) *Attorney, Agent, or Firm*—Sughrue, Mion, Zinn, Macpeak & Seas, PLLC

(57) ABSTRACT

An end-processed coaxial cable structure includes a plurality of coaxial cables, each having i) a central conductor surrounded by a dielectric layer, ii) a shielding layer surrounding the dielectric layer, and iii) a jacket layer surrounding the shielding layer. End portions of the coaxial cables have jacket layers removed to expose shielding layer end portions. Metal ground bars are fixed with solder to the shielding layer end portions. The shielding layer end portions are shorter than a width of the metal ground bars so that the shielding layer end portions do not project to the outside of the metal ground bars.

6 Claims, 3 Drawing Sheets

END-PROCESSED COAXIAL CABLE STRUCTURES AND METHODS FOR PRODUCING THE SAME

FIELD OF THE INVENTION

The present invention relates to end-processed structures of extra fine coaxial cables for high-speed transmission, which are suitable for applications such as liquid-crystal displays of personal computers, terminals of small-sized communications equipment and internal wiring of electronic equipment, and to methods for producing the same.

BACKGROUND OF THE INVENTION

With the recent spread of various small-sized electronic equipment including personal computers, it has come to be required that a plurality of coaxial cables are wired so as to match characteristic impedance with high precision in narrow space. In order to meet such a requirement, for each of the plurality of coaxial cables, it has become necessary that an outer conductor (shielding layer) is surely grounded, and that a central conductor is securely connected to each of determinedly spaced connector terminals or a circuit of a substrate.

For that purpose, it has come to connect the cables together, using a flat cable in which the plurality of coaxial cables are arranged at determined intervals and adhered to tapes. However, the problem has arisen that the thinner coaxial cables results in lower strength of connected portions.

As a means for solving such a problem, a process is proposed which comprises e sing shielding layers in the vicinity of end portions of a plurality of coaxial cables, fixing two pair of ground bars (metal foils) to the shielding layers with solder, bending the cables taking an approximately intermediate portion between the two pairs of ground bars as a fulcrum to cut the shielding layers, thereafter removing the shielding layers together with the metal ground bar on the end portion side to expose insulating layers (dielectric layers), adhering plastic tapes to the insulating layers by melting to fix respective insulating cores at determined intervals, followed by cutting the insulating layers with a laser beam, shifting the insulating layers of the end portions in a direction to remove them to expose central conductors, cutting off end side portions including the plastic tapes, and coating end portions of the central conductors with solder (Japanese Patent Unexamined Publication No. 10-144145).

However, in such a conventional process, the metal ground bars are fixed to the exposed shielding layers with solder in the vicinity of the end portions of the plurality of coaxial cables, so that the solder flows out of the metal ground bars to the shielding layers. Moreover, the two pairs of metal ground bars are provided, and the cables are bent, taking an approximately intermediate portion between the two pairs of ground bars as a fulcrum to cut the shielding layers, followed by removing the shielding layers together with the metal ground bar on the end portion side. As shown in FIG. 5, therefore, a solder layer 6 containing the shielding layers 3 such as served wire shielding layers protrudes and remains at end faces S of the metal ground bars 5 left on the side of the plurality of coaxial cables 1. Accordingly, connection thereof to a connector becomes difficult, and the use for applications in which high voltage is applied allows current to leak between the shielding layers 3 and the central conductor 8 to cause poor insulation in some cases. The incidence of defective products has therefore amounted to a value as high as 30% to 40%.

Furthermore, the two pairs of metal ground bars are used, and of these, the one pair on the end portion side are removed and discarded together with the shielding layers, resulting in high cost.

SUMMARY OF THE INVENTION

An object of the present invention is to solve such problems of the conventional process to provide an end-processed coaxial cable structure which has no projection of shielding layers and no protrusion of solder from metal ground bars, is very smooth in end faces of metal ground bars, so that the incidence of defective products caused by the difficulty of connection thereof to a connector or occurrence of poor insulation between shielding layers and central conductors can be significantly decreased, and moreover, can be reduced in cost because only one pair of metal ground bars are used. Another object of the present invention is to provide a method for producing the same.

For attaining the above-mentioned objects, the present inventors have conducted intensive investigation. As a result, when metal ground bars are attached onto dielectric layers with shielding layers remaining thereon in the vicinity of a cut end portion of a coaxial cable assembly formed by paralleling a plurality of coaxial cables, the present inventors have discovered that the objects of the present invention is attained by using only one pair of metal ground bars and allowing cut ends of the shielding layers to exist substantially inside the metal ground bars not to project to the outside thereof, thus completing the invention.

That is to say, according to the present invention, there are provided the following end-processed coaxial cable structures and methods for producing the same:

(1) An end-processed coaxial cable structure in which at least one end of a coaxial cable assembly formed by paralleling a plurality of coaxial cables is cut, jacket layers are removed in the vicinity of a cut end portion thereof to expose shielding layers, said shielding layers are further cut to a determined length to expose dielectric layers, said exposed shielding layers are put between metal ground bars to cover them, and said metal ground bars are fixed with solder onto the shielding layers and the dielectric layers arranged at determined intervals, which is characterized in that cut ends of said shielding layers exist substantially inside the metal ground bars and are not projected to the outside thereof;

(2) The end-processed coaxial cable structure described in the above (1), wherein the length from portions at which the jacket layers are to be removed to the cut ends of the shielding layers is shorter than the width of the metal ground bars;

(3) The end-processed coaxial cable structure described in the above (1) or (2), wherein the dielectric layers are formed of a fluororesin;

(4) The end-processed coaxial cable structure described in the above (1), (2) or (3), wherein central conductors exposed by removing the dielectric layers in the vicinity of the cut end portions of said coaxial cables are overcoated with solder;

(5) The end-processed coaxial cable structure described in the above (4), wherein end portions of the central conductors are fixed and protected at determined intervals with a fixing member;

(6) The end-processed coaxial cable structure described in the above (5), wherein the fixing member is an adhesive tape;

(7) The end-processed coaxial cable structure described in any one of the above (1) to (6), wherein the plurality of coaxial cables are colored to different colors for identification;

(8) A method for producing an end-processed coaxial cable structure comprising cutting at least one end of a coaxial cable assembly formed by paralleling a plurality of coaxial cables, removing jacket layers in the vicinity of a cut end portion thereof to expose shielding layers, further cutting said shielding layers to a determined length to expose dielectric layers, putting said exposed shielding layers between metal ground bars to cover them in a state where cut ends thereof are not substantially projected from the metal ground bars, and fixing said metal ground bars with solder onto the shielding layers and the dielectric layers arranged at determined intervals;

(9) The method described in the above (8), wherein the length from portions at which the jacket layers are to be removed to the cut ends of the shielding layers is shorter than the width of the metal ground bars;

(10) The method described in the above (8) or (9), which further comprises separating the shielding layers from the dielectric layers, fixing the shielding layers to a fixing member, pulling the shielding layers fixed to the fixing member apart from the dielectric layers, and cutting the shielding layers to a determined length;

(11) The method described in any one of the above (8) to (10), which comprises cutting said shielding layers to a determined length to expose the dielectric layers, followed by paralleling said shielding layers and dielectric layers, fixing said dielectric layers with a fixing member at determined intervals, then, putting said shielding layers between the metal ground bars to cover them in a state where the cut ends thereof are not substantially projected from the metal ground bars, and fixing said metal ground bars with solder onto the shielding layers and the dielectric layers arranged at determined intervals;

(12) The method described in any one of the above (8) to (11), which further comprises irradiating the dielectric layers on the leading edge side of said metal ground bars with a laser beam to cut and remove said dielectric layers, and overcoating exposed central conductors with solder;

(13) The method described in the above (12), which further comprises fixing the dielectric layers on the leading edge side of said metal ground bars with a fixing member, irradiating an intermediate portion between said metal ground bars and said fixing member, or said fixing member with the laser beam to cut the dielectric layers, and pulling out said fixing member, thereby removing the plurality of dielectric layers at once;

(14) The method described in any one of the above (8) to (13), wherein said dielectric layers are formed of a fluororesin;

(15) The method described in any one of the above (12) to (14), wherein end portions of the central conductors are fixed and protected at determined intervals with a fixing member; and

(16) The method described in the above (10), (11), (13) or (15), wherein the fixing member is an adhesive tape.

BRIEF DESCRIPTION OF THE DEAWINGS

Figure 4:
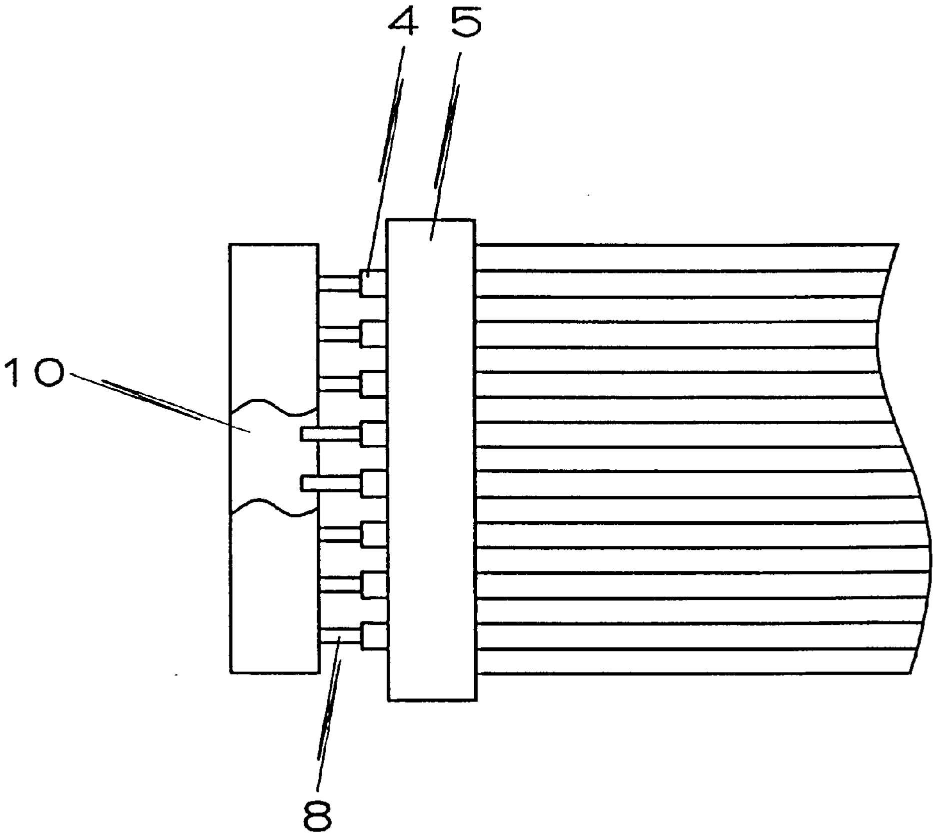
Figure 5:
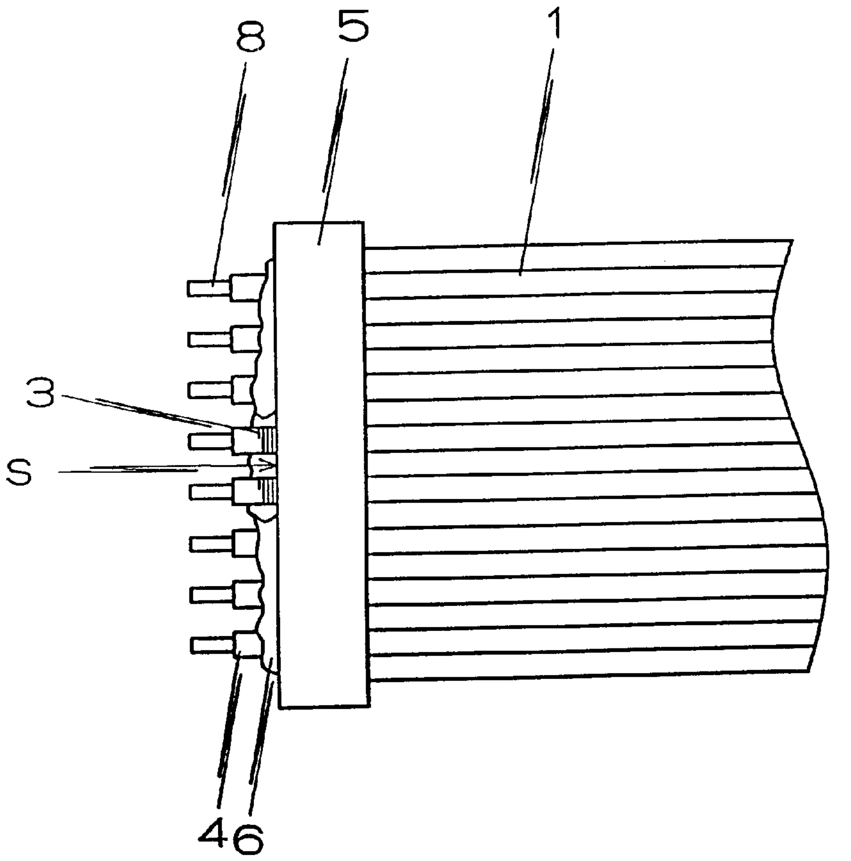
Fig. 5 PRIOR ART

FIG. 4 a plan view partially broken away showing one embodiment of an end-processed coaxial cable structure of the present invention; and FIG. 5 is a plan view partially broken away showing one embodiment of a conventional end-processed coaxial cable structure.

DESCRIPTION OF PREFERRED EMBODIMENTS

The present invention will be illustrated below in more detail with reference to the drawings.

Figure 1:
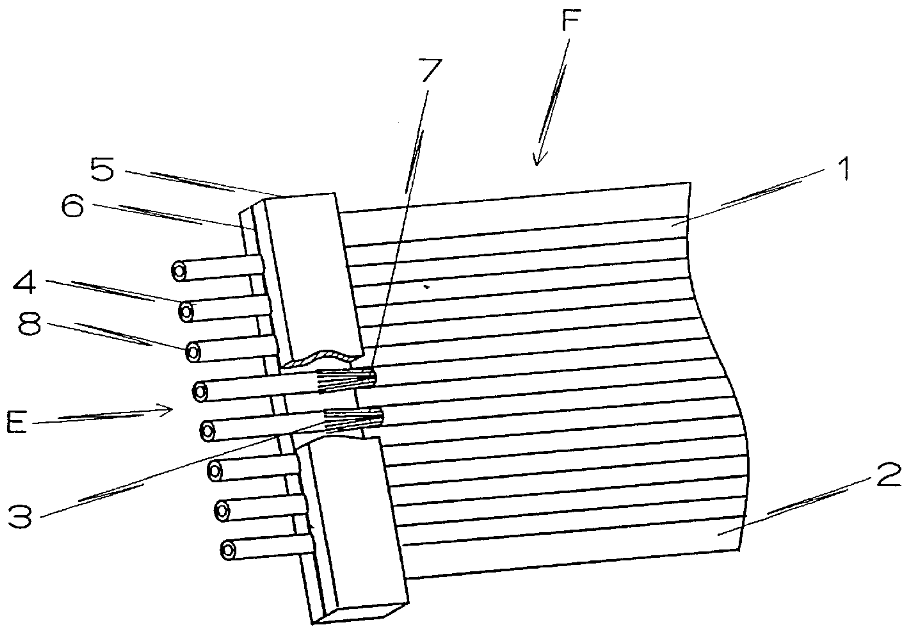
FIG. 1 is a perspective view partially broken away showing one embodiment of an end-processed coaxial cable structure of the present invention.
Figure 2:
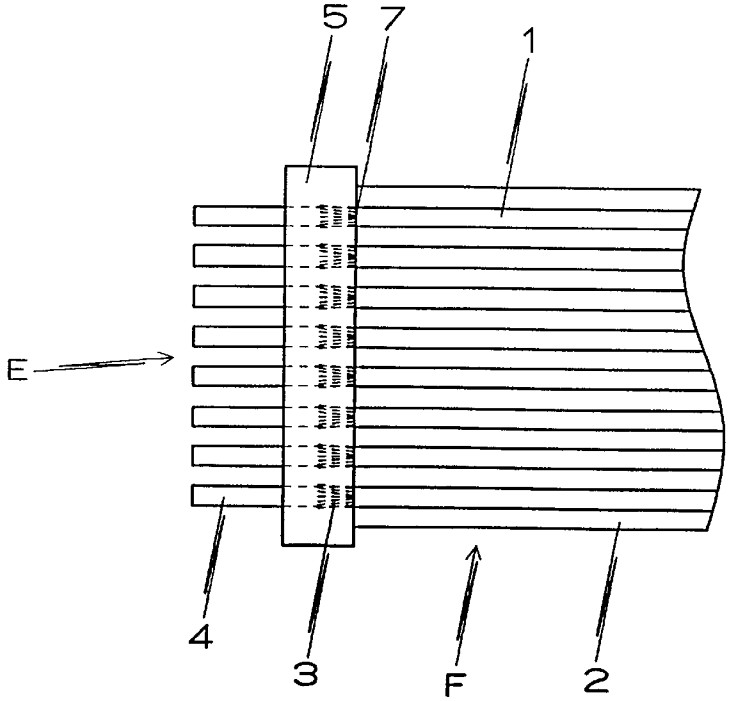
FIG. 2 is a plan view of FIG. 1.

FIG. 1 is a perspective view partially broken away showing one embodiment of an end-processed coaxial cable structure of the present invention, and FIG. 2 is a plan view thereof.

Referring to FIGS. 1 and 2, one end E of a flat cable F in which a plurality of coaxial cables 1 are paralleled and fixed with adhesive tapes 2 is cut, a jacket layers are removed in the vicinity of the cut end E to expose shielding layers 3, the shielding layers 3 are further cut to a determined length to expose dielectric layers 4, the exposed shielding layers are covered with metal ground bars 5, and the metal ground bars 5 are fixed with the solder 6 onto the shielding layers 3 and the dielectric layers 4 arranged at determined intervals.

In this case, the present invention requires that cut ends of the shielding layers 3 exist substantially inside the metal ground bars 5 and are not projected to the outside thereof. If the shielding layers are projected to the outside of the metal ground bars 5, the projected shielding layers themselves are an obstacle to the connection to a connector, and moreover, cause poor insulation between the shielding layers 3 and the central conductors 8. Besides, when the shielding layers 3 are put between and covered with the metal ground bars 5, which are fixed with solder 6 onto the shielding layers 3 arranged at determined intervals, the solder 6 flows out to the outside of the metal ground bars 5 along the shielding layers 3 and is solidified. This protruded solder also causes an obstacle to the connection to a connector and poor insulation between the shielding layers 3 and the central conductors 8. The incidence of defective products is therefore increased, so that this is unsuitable.

"The cut ends of the shielding layers 3 exist "substantially" inside the metal ground bars 5 and are not projected to the outside thereof" as used herein means that the length of the shielding layers 3 projected from end faces on the cut side of the shielding layers 3 is 0.2 mm or less, and preferably 0.1 mm or less, and more preferably, that no shielding layers are projected at all. Even if the cut ends of the shielding layers 3 are projected to the outside of the metal ground bars 5, 0.2 mm or less brings about no substantial protrusion of the solder 6, which causes no actual obstacle to attachment to a connector. Even when the dielectric layers 4 on the leading edge side of the metal ground bars 5 are cut and removed to expose the central conductors 8, they are cut and removed, leaving about 2-mm dielectric layers 4. Accordingly, even the use under high voltage results in no occurrence of poor insulation between the shielding layers 3 and the central conductors 8.

There is no particular limitation on the length from jacket layer-removed portions 7 to the cut ends of the shielding layers 3, as long as the cut ends of the shielding layer 3 are not projected to the outside of the metal ground bars 5 (for example, even when the length of the shielding layers 3 is long, it suffices that the cut ends of the shielding layers 3 are arranged so as not to be projected to the outside of the metal ground bars 5 in fitting the metal ground bars 5 onto the dielectric layers 4 in positions to which the metal ground bars 5 are to be attached.). However, when after parallel arrangement of the cut shielding layers 3 together with wires in which the dielectric layers 4 are exposed, the shielding layers 3 are put between and covered with the metal ground bars 5, which are fixed with the solder 6 onto the dielectric layers 4 arranged at determined intervals, it becomes necessary that the length from the jacket layer-removed portions 7 to the cut ends of the shielding layers 3 is shorter than the width of the metal ground bars 5. Usually, the length from the jacket layer-removed portions 7 to the cut ends of the shielding layers 3 is preferably from 10% to 100%, and more preferably from 20% to 80%, of the width of the metal ground bars. For ease of connection to a connector, a slight clearance is sometimes formed between the jacket layer-removed portions 7 and the metal ground bars 5. In this case, the length of the shielding layers 3 put between the metal ground bars 5 may be within the above-mentioned range.

The metal ground bars 5 are metallic foils having a thickness of 0.05 mm to 1.0 mm which is formed of a metal such as solder-plated copper. At present, ones having widths of 0.6 mm and 1.14 mm are used regularly.

Figure 3:
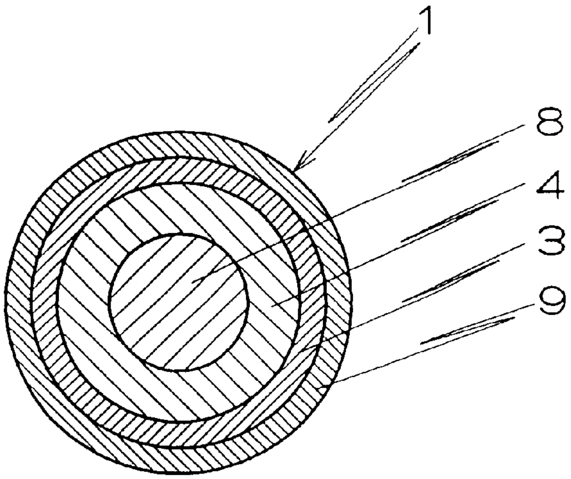
FIG. 3 is a cross sectional view showing one embodiment of a coaxial cable used in the present invention.

The coaxial cable 1 as used herein comprises the central conductor 8 covered with the dielectric layer 4, the shielding layer 3 provided thereon, and the jacket layer 9 covering the outside thereof, as shown in FIG. 3.

As the central conductor 8, one or seven wires twisted of tin-containing copper alloy or the like, each of the wires having a diameter of 0.09 mm to 0.15 mm, are usually employed, but the present invention is not limited thereto.

As the dielectric layer 4, any resins having insulating properties can be used. Normally, polyethylene and fluororesins are used. However, in terms of signal transmission characteristics and heat resistance in conducting solder fixing, fluororesins such as tetrafluoroethylene-perfluoroalkyl vinyl ether copolymers (PFA), tetrafluoroethylene-hexafluoropropylene copolymers (FEP) and polytetrafluoroethylene (PTFE) are preferably used.

Further, as the shielding layers 3, served or braided shields of tin-containing copper alloy or annealed copper wires are normally used. Recently, a synthetic resin film over which copper or aluminum is deposited is further wrapped around thereon so that a deposited face is in contact with the served or braided shield and a film face (non-deposited face) is adhered to the side of the jacket layer 9 by melting.

Furthermore, the jacket layers 9 include ones usually employed as jacket layers for coaxial cables, such as polyester films and fluororesins.

In the above-mentioned example, the flat cable F is used in which the plurality of coaxial cables 1 are paralleled and fixed with the adhesive tapes 2. However, the plurality of coaxial cables 1 may be paralleled at the portion of the metal ground bars 5 and fixed at determined intervals as a bundle of coaxial cables without fixing them with the adhesive tape 2, if necessary.

Further, in the cut end portions of the above-mentioned coaxial cables 1, the dielectric layers 4 may be removed, and the exposed central conductors 8 maybe overcoated with solder. Furthermore, as shown in FIG. 4, the end portions of the central conductors 8 may be fixed and protected with a fixing member 10 at determined intervals. As the fixing member 10, an adhesive tape is normally used. However, any one can be used as long as it can fix and protect the end portions of the central conductors 8.

A structure may be used in which the plurality of coaxial cables 1 having the same outside diameter and different in the diameter of the central conductors 8 are paralleled in combination, and a structure may also be used in which the coaxial cables 1 containing the central conductors 8 having the same diameter and different in the outside diameter are paralleled in combination. Further, a structure may be used in which the plurality of coaxial cables 1 different in the diameter of the central conductors 8 and the outside diameter, respectively, are paralleled in combination. Furthermore, the plurality of coaxial cables 1 may be colored to different colors for identification.

The method for producing the end-processed coaxial cable structure of the present invention comprises cutting at least one end of a coaxial cable assembly formed by paralleling the plurality of coaxial cables 1, and removing the jacket layers 9 in the vicinity of the cut end portion thereof to expose the shielding layers 3. As shown in FIGS. 1 and 2, in the case of the flat cable F in which the plurality of coaxial cables 1 are paralleled and fixed with the adhesive tapes 2, the adhesive tape 2 is also removed simultaneously with the removal of the jacket layers 9. In this case, it is convenient to remove the jacket layers 9 or the jacket layers 9 and the adhesive tape 2 by irradiating a laser beam to make a cut.

When the metal-deposited film is provided on the served or braided shields of tin-containing copper alloy or annealed copper wires as the shielding layers 3, this metal-deposited film is removed together with the jacket layers 9, considering it as the jacket layers 9.

When the plurality of coaxial cables 1 are used as the bundle of coaxial cables without fixing them with the adhesive tape 2, it makes easy subsequent operations that the plurality of coaxial cables 1 are fixed with an adhesive tape or the like at determined intervals at a portion at which the jacket layers 9 are to be removed.

Then, the shielding layers 3 are loosened, and the exposed shielding layers 3 are removed from the dielectric layers 4. The shielding layers 3 and the dielectric layers 4 are easily separated from each other due to the difference in their elasticity.

Thereafter, the shielding layers 3 are cut to a determined length to expose the dielectric layers 4. In particular, when the shielding layers 3 and wires in which the dielectric layers 4 are exposed are linearly paralleled, and the shielding layers 3 are cut to a determined length in a state where only the shielding layers 3 are adhered to a fixing member such as an adhesive tape to fix them, thereby exposing the dielectric layers 4, the shielding layers 3 can be easily cut.

The fixing members as used herein include a member in which the wires are put between a pair of grooved plates or rubber sheets to fix them at determined intervals, as well as the adhesive tape.

In this case, there is no particular limitation on the length from jacket layer-removed portions 7 to the cut ends of the shielding layers 3, as long as the cut ends of the shielding layer 3 are not projected to the outside of the metal ground bars 5. However, when after parallel arrangement of the cut shielding layers 3 together with the wires in which the dielectric layers 4 are exposed, the shielding layers 3 are put between and covered with the metal ground bars 5, which are fixed with the solder 6 onto the shielding layers 3 and the dielectric layers 4 arranged at determined intervals, it becomes necessary that the length from the jacket layer-removed portions 7 to the cut ends of the shielding layers 3 is shorter than the width of the metal ground bars 5. Usually, the length from the jacket layer-removed portions 7 to the cut ends of the shielding layers 3 is preferably from 10% to 100%, and more preferably from 20% to 80%, of the width of the metal ground bars. When a slight clearance is formed between the jacket layer-removed portions 7 and the metal ground bars 5, the length of the shielding layers 3 put between the metal ground bars 5 may be within the above-mentioned range.

Then, the wires in which the dielectric layers 4 are exposed are fixed with a fixing member at determined intervals, the exposed shielding layers 3 are put between the one pair of metal ground bars 5 to cover them in a state where the cut ends thereof are not substantially projected from the metal ground bars 5, and the metal ground bars 5 are fixed with the solder 6 onto the shielding layers 3 and the dielectric layers 4 arranged at determined intervals.

The fixing members as used herein include a grooved paralleling jig for paralleling the wires at determined intervals and fixing them, which is attached to a metal ground bar fitting device, a member in which the wires are put between a pair of grooved plates or rubber sheets to fix them at determined intervals, as well as the adhesive tape.

Thereafter, the dielectric layers 4 on the leading edge side of the metal ground bars 5 are irradiated with a laser beam to cut and remove the dielectric layers 4, and the resulting exposed central conductors 8 are overcoated with solder, if necessary. In this case, the dielectric layers 4 on the leading edge side of the metal ground bars 5 are fixed with a fixing member such as an adhesive tape, an intermediate portion between the metal ground bars 5 and the fixing member, or the fixing member is irradiated with the laser beam to cut the dielectric layers 4, and the fixing member is pulled out to remove the plurality of dielectric layers 4 at once. Thereby, the dielectric layers 4 can be efficiently removed. When the dielectric layers 4 on the leading edge side of the metal ground bars 5 are cut and removed to expose the central conductors 8, they are cut and removed, usually leaving about 2-mm dielectric layers 4 for keeping insulation between the metal ground bars 5 and the central conductors 8.

The fixing members as used herein include a member in which the wires are put between a pair of grooved plates or rubber sheets to fix them at determined intervals, as well as the adhesive tape, as with the fixing members previously used in cutting the shielding layers.

Then, the end portions of the central conductors 8 overcoated with the solder are fixed with the fixing member 10 at determined intervals to protect them as shown in FIG. 4, if necessary.

As the fixing member 10, an adhesive tape is normally used. However, any one can be used as long as it can fix and protect the end portions of the central conductors 8.

Needless to say, the above-mentioned end processing may be conducted not only at one end of the structure, but also at both ends thereof.

The present invention will be illustrated in more detail with reference to the following examples, which are, however, not to be construed as limiting the invention.

EXAMPLES

Example 1

Seven tin-containing copper alloy wires each having a diameter of 0.03 mm were twisted together to form a central conductor, which was overlaid with a fluororesin (PFA) having a thickness of 0.06 mm, and a tin-containing copper alloy wire having a diameter of 0.03 mm was served thereon to form a shielding layer. Then, a copper-deposited polyester film was wrapped around thereon, and a colored polyester film was further wrapped around thereon as a jacket layer to form a coaxial cable having an outside diameter of 0.33 mm.

The twenty coaxial cables thus obtained were arranged in parallel at 0.5-mm intervals, and adhesive tapes were laminated with the coaxial cables from both sides to form a flat cable.

Then, one end of this flat cable was cut, and a position 15 mm apart from the cut end thereof was irradiated with a carbon dioxide laser beam to make a cut. The adhesive tapes, the copper-deposited films and the jacket films were pulled out and removed to expose the served shielding layers. Thereafter, the shielding layers were loosened, and the exposed shielding layers were separated from the dielectric layers.

Thereafter, the shielding layers separated from the dielectric layers and the wires in which the dielectric layers were exposed were linearly paralleled, and the shielding layers were adhered to an adhesive tape. Then, the shielding layers were cut so that the length thereof from jacket layer-removed portions to cut ends of the shielding layers becomes 0.35 mm, and the shield layers thus cut were removed together with the adhesive tape.

Then, the wires in which the dielectric layers were exposed were fixed with an adhesive tape at determined intervals, and the exposed shielding layers, together with solder, were put between a pair of metal ground bars having a width of 0.6 mm to cover them so that the cut ends thereof were not substantially exposed from the metal ground bars, followed by heating at 240° C. Thus, the metal ground bars were fixed with solder onto the shielding layers and the dielectric layers arranged at determined intervals.

Thereafter, the dielectric layers on the leading edge side of the metal ground bars were fixed with an adhesive tape at determined intervals, and an intermediate portion between the metal ground bars and the adhesive tape was irradiated with a carbon dioxide laser beam to cut the dielectric layers. The plurality of dielectric layers were removed at once by pulling out the adhesive tape, and the exposed central conductors were overcoated with solder.

In the end-processed coaxial cable structure thus obtained, the cut ends of the shielding layers were not projected at all to the outside of the metal ground bars, and no protrusion of solder was observed. Accordingly, end faces of the metal ground bars were very smooth, so that poor insulation did not occur between the shielding layers and the central conductors, and the incidence of poor connection to a connector was 0%. Further, the use of only one pair of ground bars could reduce the cost.

Comparative Example

Using the flat cable produced in Example 1, an end-processed coaxial cable structure was produced in accordance with the example of Japanese Patent Unexamined Publication No. 10-144145. That is to say, shielding layers were exposed in the vicinity of an end portion of the flat cable, and two pairs of metal ground bars were fixed to the shielding layers with solder. Then, the coaxial cables were bent, taking an approximately intermediate portion between the two pairs of ground bars as a fulcrum to cut the shielding layers, followed by removing the shielding layers together with the metal ground bars on the end portion side to expose dielectric layers. Plastic tapes were adhered to the insulating layers by melting to fix respective insulating cores at determined intervals, followed by cutting the insulating layers with a laser beam. The insulating layers of the end portions were shifted in a direction to remove them to expose central conductors, and end side portions including the plastic tapes were cut off. Then, end portions of the central conductors were coated with solder.

In the resulting end-processed coaxial cable structure, the cut ends of the shielding layers 3 containing the solder 6 were projected to the outside of the metal ground bars 5, ranging in length from 0 mm to 1.0 mm, as shown in FIG. 5, which caused poor insulation between the shielding layers 3 and the central conductors 8. The incidence of poor connection to a connector amounted to a value as high as 26%. Further, the use of two pairs of metal ground bars brought about an increase in cost.

Example 2

Seven tin-containing copper alloy wires each having a diameter of 0.04 mm were twisted together to form a central conductor, which was overlaid with a fluororesin (FEP) having a thickness of 0.09 mm, and annealed copper wires each having a diameter of 0.03 mm was braided thereon to form a shielding layer. Then, a colored polyester film was wrapped around thereon as a jacket layer to form a coaxial cable having an outside diameter of 0.51 mm.

The twenty coaxial cables thus obtained were used as a bundle of coaxial cables without formation of a flat cable, and fixed with an adhesive tape at determined intervals at portions at which the jacket layers were to be removed. Then, one end of the bundle was cut, and a position 15 mm apart from the cut end thereof was irradiated with a carbon dioxide laser beam from above the adhesive tape to make a cut. The adhesive tape and the jacket layers were pulled out and removed to expose the braided shielding layers. Thereafter, the shielding layers were loosened, and the exposed shielding layers were separated from the dielectric layers.

Thereafter, the shielding layers separated from the dielectric layers and the wires in which the dielectric layers were exposed were linearly paralleled, and the shielding layers were pinched by a fixing member comprising two rubber sheets to fix them. Then, the shielding layers were cut so that the length thereof from jacket layer-removed portions to cut ends of the shielding layers becomes 0.7 mm, and the cut shield layers fixed by the rubber sheet fixing member were removed.

Then, the wires in which the dielectric layers were exposed were fixed at determined intervals by a grooved paralleling jig attached to a metal ground bar fitting device, and the exposed shielding layers, together with solder, were put between a pair of metal ground bars having a width of 1.14 mm to cover them so that the cut ends thereof were not substantially exposed from the metal ground bars, followed by heating at 240° C. Thus, the metal ground bars were fixed with solder onto the shielding layers and the dielectric layers arranged at determined intervals.

Thereafter, the dielectric layers on the leading edge side of the metal ground bars were fixed with an adhesive tape at determined intervals, and an intermediate portion between the metal ground bars and the adhesive tape was irradiated with a carbon dioxide laser beam to cut the dielectric layers. The plurality of dielectric layers were removed at once by pulling out the adhesive tape, and the exposed central conductors were overcoated with solder.

Then, for protecting end portions of the central conductors overcoated with the solder, the end portions of the central conductors were fixed with an adhesive tape at determined intervals.

In the end-processed coaxial cable structure thus obtained, the cut ends of the shielding layers were not projected at all to the outside of the metal ground bars, and no protrusion of solder was observed. Accordingly, end faces of the metal ground bars were very smooth, so that poor insulation did not occur between the shielding layers and the central conductors, and the incidence of poor connection to a connector was 0%. Further, the use of only one pair of ground bars could reduce the cost.

EFFECTS OF THE INVENTION

According to the present invention, the shielding layers are not projected from the metal ground bars, and therefore, no solder is protruded, resulting in the very smooth end faces of the metal ground bars.

The solder for fixedly laminating a pair of metal ground bars with the shielding layers and the dielectric layers is good in the wetting with the shielding layers. Accordingly, when the shielding layers are projected from the metal ground layers, the solder is protruded from the metal ground bars through the shielding layers. However, when the shielding layers are not projected from the metal ground bars, the solder is not protruded from the metal ground bars, because the solder is poor in the wetting with synthetic resins forming the dielectric layers, particularly the fluororesins. In the present invention, the shielding layers are not substantially projected from the metal ground bars, so that the solder is not protruded from the metal ground bars, resulting in the very smooth end faces of the metal ground bars.

As a result, the incidence of defective products due to the difficulty of connection thereof to a connector, or the leak of current between the shielding layers and the central conductors developed in using the coaxial cable structures at high voltage which results in occurrence of poor insulation can be significantly decreased. Moreover, the cost can be reduced, compared with the conventional process using two pairs of metal ground bars, because only one pair of metal ground bars are used in the present invention.

What is claimed is:

1. An end-processed coaxial cable structure comprising:

a plurality of coaxial cables, each having i. a central conductor surrounded by a dielectric layer, ii. a shielding layer surrounding said dielectric layer, and iii. a jacket layer surrounding said shielding layer, end portions of said coaxial cables having jacket layers removed to expose shielding layer end portions; and metal ground bars covering and fixed with solder to said shielding layer end portions;

wherein said shielding layer end portions are shorter than a width of said metal ground bars.

2. The end-processed coaxial cable structure according to claim 1, wherein said dielectric layers are formed of a fluororesin.

3. The end-processed coaxial cable structure according to claim 1, wherein end portions of said central conductors from which said dielectric layers have been removed are overcoated with solder.

4. The end-processed coaxial cable structure according to claim 3, wherein said end portions of said central conductors are fixed and protected at determined intervals with a fixing member.

5. The end-processed coaxial cable structure according to claim 4, wherein said fixing member is an adhesive tape.

6. The end-processed coaxial cable structure according to claim 1, wherein the plurality of coaxial cables are colored to different colors for identification.

* * * * *